(No Model.) 2 Sheets—Sheet 1.

E. T. STARR.
SECONDARY ELECTRIC BATTERY.

No. 279,839. Patented June 19, 1883.

WITNESSES:
Wm A. Skinkle
H. W. Elmore

INVENTOR:
Eli T. Starr,
By his Attorneys,
Baldwin, Hopkins & Peyton (No Model.)  2 Sheets—Sheet 2.

E. T. STARR.
SECONDARY ELECTRIC BATTERY.

No. 279,839.  Patented June 19, 1883.

WITNESSES:  
Wm A. Skinkle  
H. W. Elmore

INVENTOR:  
Eli T. Starr,  
By his Attorneys,  
Baldwin, Hopkins & Peyton.

UNITED STATES PATENT OFFICE.

ELI T. STARR, OF PHILADELPHIA, PA., ASSIGNOR OF ONE-HALF TO WILLIAM J. PEYTON, OF WASHINGTON, D. C., AND H. M. LEWIS AND JAMES W. WHITE, OF PHILADELPHIA, PA.

SECONDARY ELECTRIC BATTERY.

SPECIFICATION forming part of Letters Patent No. 279,839, dated June 19, 1883.

Application filed November 28, 1882. (No model.)

*To all whom it may concern:*

Be it known that I, ELI T. STARR, of the city and county of Philadelphia, in the State of Pennsylvania, have invented certain new and useful Improvements in Secondary Electric Batteries, of which the following is a specification.

My invention relates to electric secondary or storage batteries; and its objects generally are to prevent freezing of the electrolytic liquid of the battery in cold weather, to prevent short-circuiting of the battery within itself, and to improve the organization of secondary batteries, whereby their efficiency is increased.

The subject-matter claimed will be first fully described in detail as organized in the best way now known to me, and then particularly recited at the close of the specification. Some of my improvements may be used without the others and in batteries differing from that particularly described herein.

Figure 1:
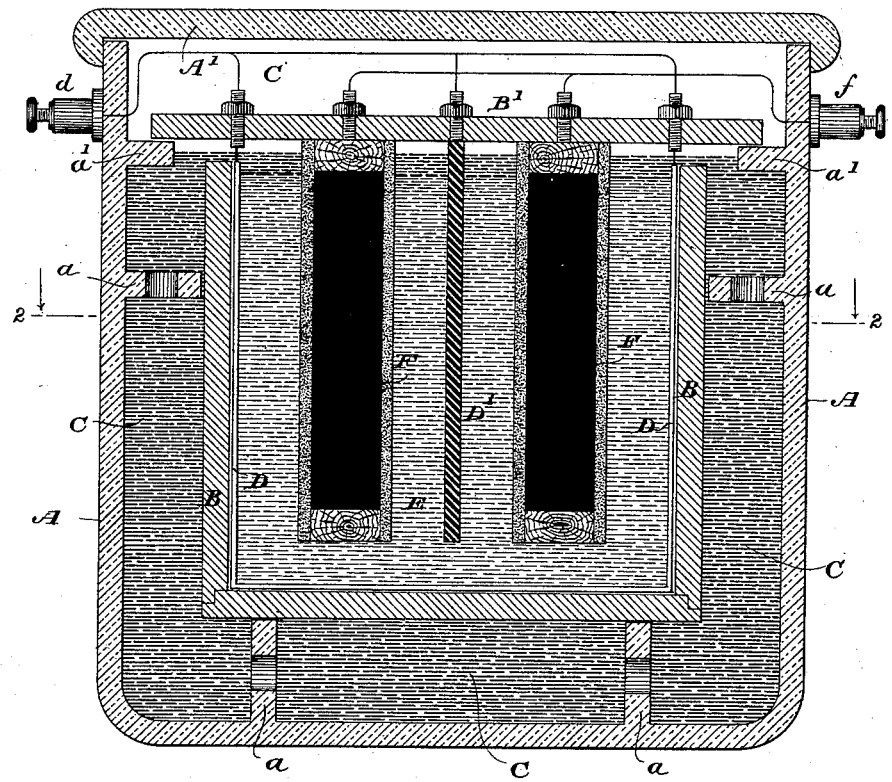
Figure 2:
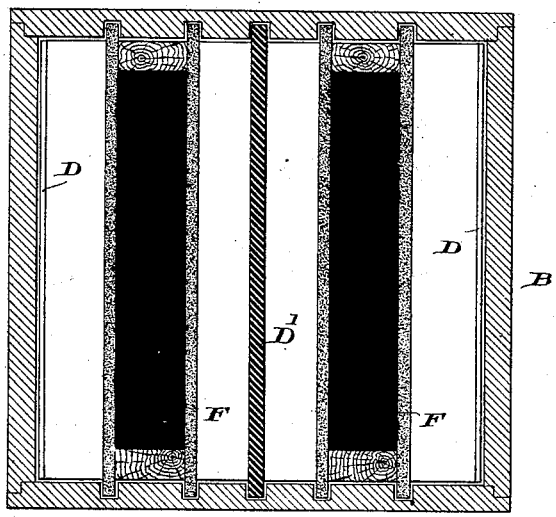
Figure 3:
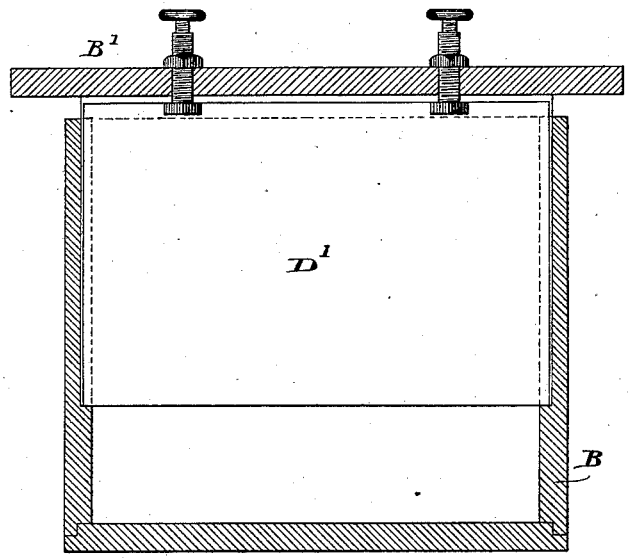
Figure 4:
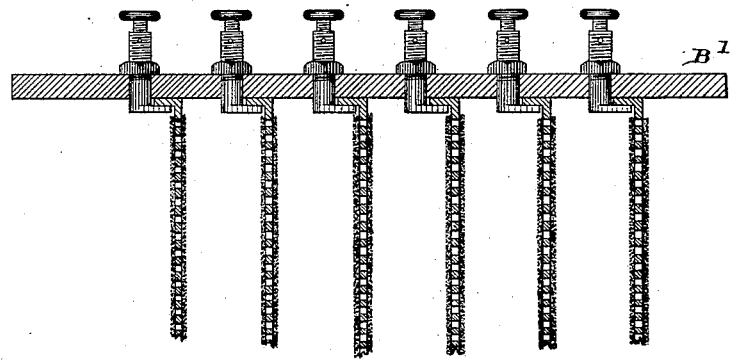

In the accompanying drawings, Figure 1 is a vertical central section through my improved battery. Fig. 2 is a horizontal section through the interior vessel of the battery, which contains the electrodes and the electrolytic liquid thereof, on the line 2 2 of Fig. 1, the view showing, particularly, the method of fitting the electrodes in said vessel. Fig. 3 is a vertical section through the interior battery-vessel and its cover at right angles to the section of Fig. 1, showing the broad side of one of the electrodes; and Fig. 4 is a view showing one way of suspending metallic battery-plates from the cover of the vessel which contains them.

The exterior battery-vessel, A, may be of any suitable shape and of any suitable material. In the present instance the vessel is rectangular in shape, and provided with a detachable cover, A'. The vessel is provided with lugs or ledges $a$, extending inward from its sides and bottom to support and steady an an interior vessel, B, which is constructed of non-conducting material and fitted within the outer vessel, so that a space, C, exists all around the sides and between the top and bottom of the two vessels, for the reception of a material which is practically a non-conductor of heat and cold. This insulating material is preferably oil, and openings are made in the interiorly-projecting ledges $a$ for its free circulation. In place of the oil, however, the space C around the interior battery-vessel may be filled or packed with other insulating material—such as finely-divided or pulverized cork, for instance. The use of this insulating material is to prevent the freezing in cold weather of the electrolytic liquid of the battery, and is also for another purpose, which will hereinafter appear.

The interior battery-vessel, B, is lined at its bottom and upon two of its sides with a sheet of metal, D—lead, for instance—and contains the electrolytic liquid E of the battery, which liquid may be the dilute sulphuric acid usually employed in secondary batteries. The non-conducting cover B' of the vessel B is not tight fitting, but is somewhat larger than the top of the vessel B, and is supported a short distance above it by resting, for instance, upon lugs $a'$, projecting inwardly from the sides of the vessel A.

A plate, D', of a metal, preferably corresponding to that of the lining D of the vessel B, is suspended from the cover B' of said vessel, and constitutes, in connection with said lining D, the positive electrode of the battery. Said lining D and plate D' are electrically connected together and to the binding-screw $d$. From the cover B' of the vessel B, on each side of the suspended plate D', and clear of the metal-lined sides of the battery-vessel B, plates or electro-conducting devices F F are also suspended, said devices being suitable for forming an electrode of a secondary battery. The devices F F are electrically connected together, and constitute the negative electrode or element of the battery in this example. This negative electrode is preferably made up of two flat masses of finely-divided active material—such as lead or lead and oxide of lead—contained within skeleton frames, which support the active masses at their edges, while said masses are supported at their broad sides by porous or perforated plates or partitions, the active masses being electrically connected together and to the binding-screw $f$.

A finely-divided boxed element such as I have described is not claimed *per se* in this case, as it constitutes matter claimed in a prior application. Such an element, however, is particularly desirable as a negative electrode in a battery organized as in the present instance, as it is capable of absorbing or collecting a large amount of hydrogen.

In charging the battery from a suitable generator of electricity, the current flowing over the conductor passes through the positive electrode D D', through the electrolytic liquid of the cell, and through the negative electrode F F to the binding-screw $f$, and from thence returns to the generator. During the passage of the current decomposition of the electrolytic liquid takes place, the liberated oxygen seeking the positive electrode and peroxidizing its surface, while the liberated hydrogen gas seeks or is collected and absorbed by the negative electrode. After charging the battery the work of the charging-current may be recovered by connecting the electrodes by a conductor, including apparatus to be operated or affected.

It is now well established that the efficiency of secondary batteries is to a large extent destroyed by local action and by a continuous and useless consumption of their energy, due to short-circuiting of the electrodes within their cells. I have found that local action and short-circuiting can be in a great degree prevented by suspending the electrodes, or one of them, clear of the bottom of the cell in the manner I have shown and described, and by permitting the insulating oil or material to flow over the surface of the electrolytic liquid. By covering the surface of the electrolytic liquid with a non-conductor, sediment cannot collect at the top with the capacity to short-circuit the battery in that direction, while by suspending the electrodes, or one of them, above the bottom of the battery-vessel, the collection of sediment or deposits from the electrodes does not effect a circuiting-connection at the bottom. I prefer, in suspending the electrodes as organized in the particular example I have shown, to fit the positive plate D' at its edges into grooves in the non-conducting sides of the battery-vessel B, and the porous or perforated plates of the negative electrode likewise in similar grooves, so as to keep them firmly in their places, with the capacity of being readily removed. Of course it will be understood that I do not limit myself to the particular organization of electrodes particularly shown and described, although that organization is preferred.

A more compact though not so powerful battery may be made by reducing the size of the battery-vessel B, and employing only the lead lining D, with one of the box elements F, as the electrodes of the battery; also, in place of the lining D and box element, suspended metal plates or plates coated with active material may be used. Such an organization as the latter is shown in Fig. 4.

In the organizations I have shown the electrodes, being suspended from the cover of the interior battery-vessel, may be removed by removing said cover. The connections by which the electrodes are suspended may obviously be widely varied.

I reserve the right to claim in a future application or applications all the patentable subject-matter of my invention substantially disclosed in this patent and not specifically claimed herein.

I claim as of my invention—

1. The combination, substantially as hereinbefore set forth, of the exterior battery-vessel having interior ribs or projections, the interior battery-vessel supported in position away from the sides of the outer battery-vessel by said ribs, and insulating material between said vessels.

2. The combination, substantially as hereinbefore set forth, of the exterior battery-vessel, the interior battery-vessel, the cover of said interior vessel supported above the top of said vessel, the electrolytic liquid of said interior vessel, and the insulating material which surrounds the sides of the interior battery-vessel, and also covers the surface of the liquid contained therein.

3. The combination of the vessel containing the liquid of the cell, the cover of said vessel, the metallic lining of said vessel constituting one of the electrodes of the battery, and connected with said cover so as to be removable therewith, and a metallic plate, or its equivalent, also connected with said cover so as to be removable therewith, constituting the other electrode of the battery, substantially as described.

In testimony whereof I have hereunto subscribed my name this 25th day of October, A. D. 1882.

ELI T. STARR.

Witnesses:
 WM. J. PEYTON,
 L. B. WIGHT.